United States Patent Office 3,315,611
Patented Apr. 25, 1967

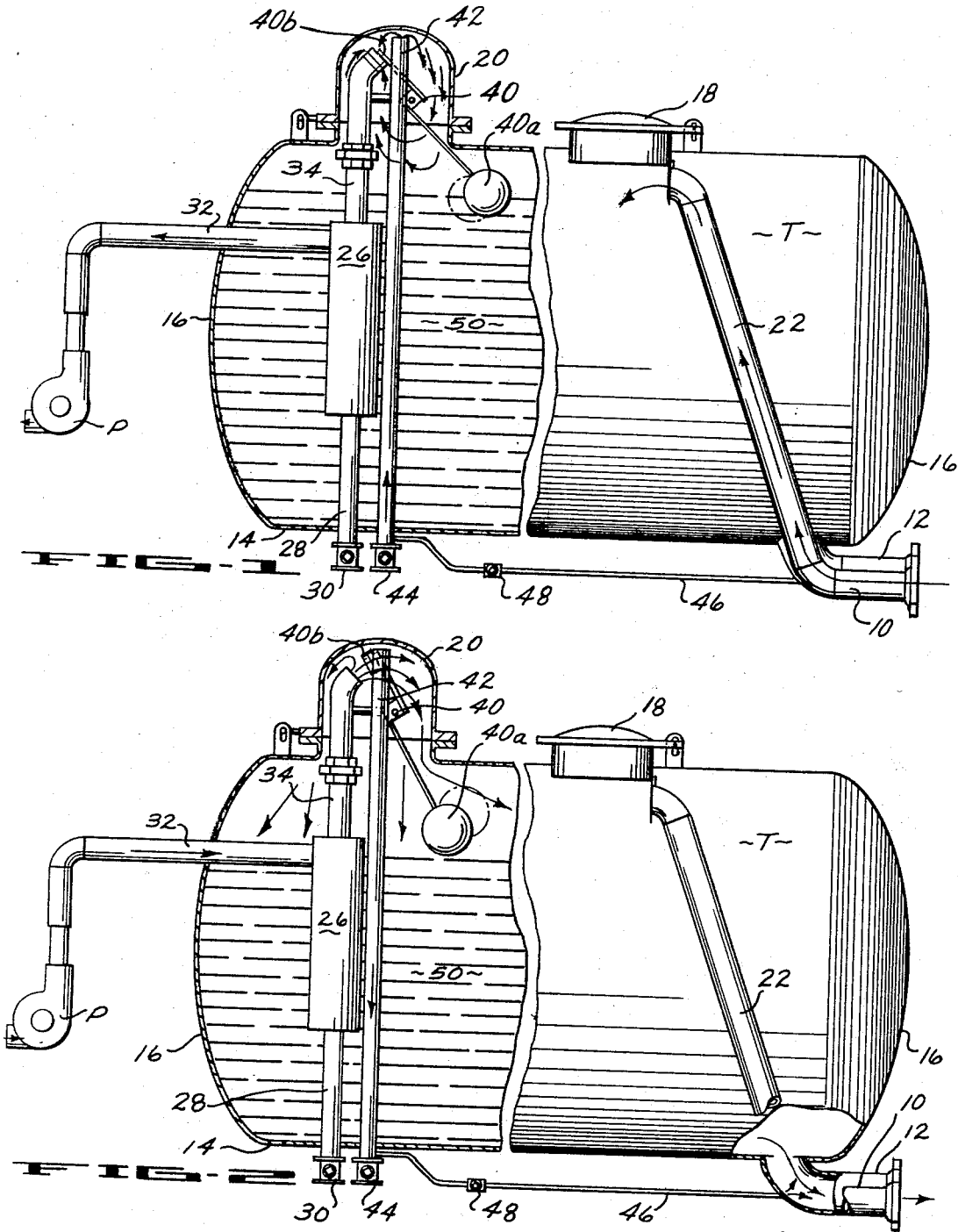

3,315,611
PORTABLE VACUUM AND PRESSURE
LIQUID TANK TRUCK
David L. Thompson, Long Beach, Calif., assignor to
Thompson Tank and Manufacturing Co. Inc., Long
Beach, Calif., a corporation of California
Filed June 28, 1965, Ser. No. 467,200
3 Claims. (Cl. 103—235)

The present invention relates generally to tank trucks and is particularly directed to a tank truck adapted to load and unload thick liquids.

There have been heretofore proposed tank trucks for loading, transporting and discharging thick liquids such as heavy crude oil and the like. Apparatus of this general nature is disclosed in L. R. Wahl et al. Patent No. 2,522,077 issued Sept. 12, 1950 and in Patent No. 2,664,911 issued Jan. 5, 1954 to Clarence S. Thompson and George E. Clark. Such tank trucks include a power-driven pump operable to alternately furnish either a vacuum or superatmospheric air pressure to the interior of the tank. The tank is provided with an inlet fitting through which liquid is drawn into the tank when the pump provides a vacuum within the tank. The tank is also provided with a discharge fitting through which liquid is exhausted from the tank when the pump supplies superatmospheric air pressure to the interior of the tank. The tank is formed with a dome, with the interior of such dome being connected to the pump by pipe means. A float valve is provided for controlling flow through the upper end of such pipe means. It has been found that where the liquids being pumped tend to foam, such foam will tend to enter the pipe means so as to thereby be drawn into the pump. The introduction of foam into the pump can readily cause damage to such pump.

It is a major object of the present invention to provide unique means for positively preventing foam from entering the pump of a vacuum and pressure liquid pipe apparatus of this nature. In this manner damage to such pump is positively prevented.

It has also been determined that when vacuum and pressure liquid tank apparatus of this nature is employed to handle very thick liquids such as heavy crude oil, it is extremely difficult to force such liquid out of the discharge fitting of the tank. It is another object of the present invention to provide novel means for aerating the liquid being discharged from a vacuum and pressure liquid tank apparatus to thereby facilitate the discharge of such heavy liquid from the tank.

The above objects are achieved in an economical and foolproof manner.

Other objects and advantages of the present invention will become apparent from the following detailed description of a preferred embodiment thereof, when taken in conjunction with the appended drawings wherein:

FIG. 1 is a side elevational view showing a portable vacuum and pressure liquid tank apparatus embodying the present invention during a liquid loading operation; and FIG. 2 is a view similar to FIG. 1 showing said apparatus during a liquid discharging operation.

Referring to the drawings, the portable vacuum and pressure liquid tank apparatus embodying the present invention utilizes a generally cylindrical tank T which may be supported upon the chassis of a motor-powered vehicle (not shown) in a conventional manner. A power-driven pump P is provided, such pump being so valved that either superatmospheric air pressure or a vacuum can be imposed upon the interior of the tank T. Upon a vacuum being applied to the interior of the tank T liquid will be drawn thereinto through an inlet fitting 10, as indicated by the directional arrows in FIG. 1. When the pump P applies superatmospheric air pressure to the interior of the tank T the liquid L contained therewithin will be forced out of the tank through a discharge fitting 12, as indicated by the directional arrows in FIG. 2.

More particularly, the tank T will be of conventional construction and is preferably formed from welded steel plates in the form of an elongated cylindrical shell 14 having bumped ends 16, with the entire tank assembly being constructed sufficiently heavy as to withstand both the air pressure and vacuum to which it will be subjected. The intermediate portion of the tank is formed with a washout member 18, while the front portion of the tank T is formed with a conventional dome 20.

The inlet fitting 10 is disposed at the lower rear portion of the tank T to one side of the longitudinal center-line thereof and may take the form of an elbow. The inlet fitting 10 is secured to the lower end of an upwardly and forwardly extending riser pipe 22. The upper portion of the riser pipe 22 terminates within the upper portion of the tank T. The discharge fitting 12 may be arranged alongside the inlet fitting 10 and is disposed at the opposite side of the longitudinal center-line of the tank T. Suitable conventional valves (not shown) will be provided for the inlet and discharge fittings.

A conventional upstanding scrubber or separator 26 is positioned within the intermediate portion of the tank T below the dome 20. The lower end of the scrubber 26 is connected to an upstanding scrubber drain pipe 28, the lower end of which extends through the lower end of the tank T. A conventional shutoff valve 30 is provided for the lower end of the drain pipe 28. The upper portion of the scrubber 26 is in communication with a pipe 32 that extends through the front end of the tank T to the pump P. An upstanding pipe 34 extends from the upper end of the scrubber 26 to the upper interior of the dome 20.

A conventional float valve 40 controls fluid flow through the upper end of the upstanding pipe 34. The float valve 40 may be similar to that shown in the aforementioned Patent No. 2,664,911 or may take the form of the float valve shown in my co-pending patent application Ser. No. 467,474, filed June 28, 1965.

A vertical bleeder pipe 42 extends through the tank T adjacent the separator 26. The upper end of the bleeder pipe 42 terminates within the upper interior portion of the dome 20, while the lower end of such pipe extends through the bottom of the tank T. A conventional shut-off valve 44 is provided for the bleeder pipe 42. A generally horizontal aerating conduit 46 extends rearwardly from the lower portion of the bleeder pipe 42 above the bleeder valve 44 to the front of the discharge fitting 12. A conventional shut-off valve 48 is provided for the aerating conduit 46.

In the operation of the aforedescribed apparatus, a conduit such as a length of hose (not shown) is affixed to the inlet fitting 10. This hose is disposed within the body of liquid (not shown) which is to be drawn into the tank T. The power-driven pump P is then operated so as to create a vacuum within the tank T. As the vacuum within the tank T increases, air is drawn inwardly through the inlet fitting 10 with considerable velocity and carries with it the liquid 50 which is to be drawn into the tank T. Liquid 50 will continue to enter the tank T until the liquid level therein is a short distance from the interior top portion of the tank. At this time the upper portion of the liquid contacts the float 40a of the float valve 40 and causes the sealing element 40b thereof to close the top of the pipe 34 whereby an air tight seal is effected between this pipe and the interior of the tank T and the flow of liquid 50 into the tank T will stop.

With reference to FIG. 1, it should be noted that during the time the liquid 50 is being drawn into the tank T the bleeder shut-off valve 44 will be open whereby atmospheric air may enter the dome 20 in the manner indicated by the directional arrows in this figure. The body of air so produced will cause any foam present in the upper portion of the tank T to be restrained against upward movement into the pipe 34. Accordingly, such foam cannot be drawn into the pump P. Addition of atmospheric air within the dome also serves to reduce the temperature of the foam. This is very important where liquids such as hot oils are being pumped since the temperature of such liquids are thereby lowered and the tendency of such liquids to foam is inhibited. In actual practice it has been determined that this is a major problem where the liquid being pumped includes a detergent, such detergent causing heavy foaming. During the liquid loading operation the shut-off valve 48 within the aerating conduit 46 will be closed. Reduction of the foam entering separator 26 is also important because if such separator becomes filled during a liquid loading operation, its drain 30 must be opened and the pumped liquid contained therein deposited on the ground. The provision of the bleeder shut-off valve 44 and bleeder pipe 42 also permits the reduction of vacuum within the tank to just the value required to load a particular material without forcing material contained in the separator 26 into the pump P.

Referring now to FIG. 2, in order to unload the liquid 50 from within the tank T, the pump P is operated so as to force air at superatmospheric pressure into the tank T through the pipe 34. The introduction of air into the pipe 34 will lift the sealing element 40b of the float valve 40 into an open position, as indicated in FIG. 2. The superatmospheric air will act upon the upper surface of the liquid 50 so as to force such liquid downwardly through the discharge fitting 12. During this unloading operation the shut-off valve 48 of the aerating conduit 46 is opened. This permits superatmospheric air to flow through the aerating conduit 46 and into the confines of the discharge fitting 12. Such air creates air bubbles that facilitate movement of the liquid outwardly through the discharge fitting 12. This is a particularly important feature where the liquid being pumped is of a thick, viscous nature.

Various modifications and changes may be made with respect to the foregoing detailed description without departing from the spirit of the persent invention or the scope of the following claims.

I claim:
1. Portable vacuum and pressure liquid tank apparatus, comprising:
    a tank;
    a dome on said tank;
    a power-driven pump adapted to supply either air pressure or a vacuum to the interior of said tank;
    pipe means connecting said pump to the dome of said tank;
    a float valve controlling fluid flow into the upper end of said pipe means;
    a bleeder conduit connecting the atmosphere with the interior of said dome;
    a second valve controlling flow through said bleeder conduit;
    an inlet conduit through which liquid is admitted to said tank;
    a discharge conduit through which liquid is exhausted from said tank;
    an aerating pipe connecting said bleeder conduit with said discharge conduit; and
    a third valve controlling flow through said aerating pipe.

2. Portable vacuum and pressure liquid tank apparatus, comprising:
    a tank;
    a dome on said tank;
    a power-driven pump adapted to supply either air pressure or a vacuum to the interior of said tank;
    a scrubber in said tank;
    a valved drain pipe for said scrubber extending through the lower portion of said tank;
    pipe means extending from said pump through the upper end of said scrubber, said pipe means terminating within said dome;
    a float valve controlling fluid flow into the upper end of said pipe means;
    a bleeder conduit connecting the atmosphere with the interior of said dome;
    a second valve controlling flow through said bleeder conduit;
    an inlet conduit through which liquid is admitted to said tank;
    a discharge conduit through which liquid is exhausted from said tank;
    an aerating pipe connecting said bleeder conduit with said discharge conduit; and
    a third valve controlling flow through said aerating pipe.

3. Portable vacuum and pressure liquid tank apparatus, comprising:
    a tank;
    a dome on said tank;
    a power-driven pump adapted to supply either air pressure or a vacuum to the interior of said tank;
    pipe means connecting said pump to the dome of said tank;
    a float valve controlling fluid flow into the upper end of said pipe means;
    a bleeder conduit extending into the upper interior portion of said dome above the upper end of said pipe means for connecting the atmosphere with the interior of said dome whereby a body of air is produced within said dome to lower the liquid foam temperature therewithin and to restrain liquid foam from being drawn into the upper end of said pipe means;
    a second valve located adjacent the lower portion of said tank controlling flow through said bleeder conduit;
    an inlet conduit through which liquid is admitted to said tank; and
    a discharge conduit through which liquid is exhausted from said tank.

References Cited by the Examiner

UNITED STATES PATENTS

| | | | |
|---|---|---|---|
| 1,587,864 | 6/1926 | Sargent | 137—205 |
| 2,180,274 | 11/1939 | Bentley | 103—235 |
| 2,400,651 | 5/1946 | Marsh | 103—235 |
| 2,434,027 | 1/1948 | Whittington | 103—235 |
| 2,530,382 | 11/1950 | Downs | 103—235 |
| 2,664,911 | 1/1954 | Thompson et al. | 137—205 |
| 2,976,814 | 3/1961 | Ver Planck et al. | 103—235 |

DONLEY J. STOCKING, *Primary Examiner.*

MARK NEWMAN, *Examiner.*

W. J. KRAUSS, *Assistant Examiner.*